Figure 1:
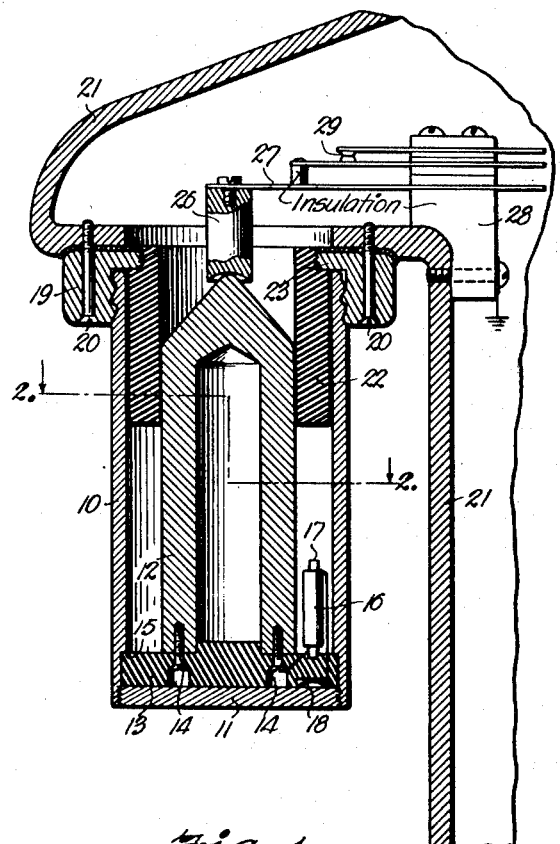

INVENTORS
Charles N. Kimball
William R. Lewis
Herman A. Strecker

BY Thos. E. Scofield
ATTORNEY.

INVENTORS.
Charles N. Kimball
William R. Lewis
Herman A. Strecker

BY
ATTORNEY.

Feb. 20, 1951  C. N. KIMBALL ET AL  2,542,928
APPARATUS FOR TESTING MATERIAL
Filed April 26, 1947  3 Sheets-Sheet 3

INVENTORS.
Charles N. Kimball
William R. Lewis
Herman A. Strecker
BY Thos. E. Aufield
ATTORNEY.

Patented Feb. 20, 1951

2,542,928

UNITED STATES PATENT OFFICE 2,542,928

APPARATUS FOR TESTING MATERIAL

Charles N. Kimball, Johnson County, Kans., William R. Lewis, Clay County, Mo., and Herman A. Strecker, Wyandotte County, Kans., assignors to C. J. Patterson Company, Kansas City, Mo., a corporation of Missouri Application April 26, 1947, Serial No. 744,120

15 Claims. (Cl. 175—183)

The present invention relates in general to testing apparatus and deals more particularly with a device for measuring the moisture content of flour, grain and other materials of solid, liquid or gaseous nature.

It is well known that certain electrical characteristics of a material vary with the relative amount of moisture contained therein, and attempts have been made in the past to measure one or more of these characteristics of a given material in order to obtain some indication of its moisture content. Apparatus has been developed, as a matter of fact, which in the hands of a skilled and painstaking technician well versed in the theory of the apparatus has been capable of yielding satisfactory results. Such apparatus is not suitable for general use in routine testing, however, because of the skill and knowledge required of the operator and in some cases also because of the intricate character of the test equipment itself. Very frequently in the past the moisture determination has been based upon comparative measurements of the test material on one hand and a known standard on the other, and in all cases the readings obtained have required mathematical conversion by means of conversion factors, charts or curves in order finally to obtain a figure representing the percentage moisture content of the material.

It is a primary object of the present invention to provide a reliable moisture meter which is exceedingly simple and convenient to use whereby an unskilled, untrained operator can with a minimum of effort quickly and accurately determine the moisture content of a given material.

Another object is to provide a moisture meter which is calibrated to read directly the percentage moisture content of the test material so that no conversion factors or correction factors are required.

Another object of the invention is to provide a moisture meter which registers the correct reading on a dial or the like automatically and without any manual adjustment of the dial. More specifically, it is an object to provide a moisture meter which operates on a self-seeking basis; and in this connection another object of the invention is to arrange for the giving of a signal responsive to a meter arriving at the correct reading.

A further object of the invention is to provide an improved test cell for receiving a sample of the test material, together with an improved arrangement for connecting the cell to the testing circuit. Another object is to provide different cells for different types of materials, and facilities for altering the circuits of the meter conveniently to suit the type of material tested.

An important feature of the invention resides in the provision of an easily portable cup-shaped test cell for receiving a sample of the material to be tested. A fixed support to which the cell may easily be attached is provided, and whenever it is thus attached the cell automatically is connected to the circuits of the moisture meter. Where the test material is of compressible character, as in the case of flour and dried milk, for example, a piston is arranged to compress the specimen to a predetermined density automatically when the cell is properly attached to the support; this contributes very materially to the accuracy of the results, and a safety device is provided for preventing the taking of erroneous readings in the event the material for any reason is not thus compressed.

Another feature resides in the arrangements made to compensate automatically for variation in the electrical characteristic of a sample due to thermal changes, these arrangements being different for different materials.

According to the invention the test cell is incorporated in a network containing a motor-driven tuning device. When the network is brought to a predetermined critical condition by the tuning device, arrangements are provided for automatically halting the device and in accordance with its stopping point registering the percentage moisture content of the material in the test cell. More specifically, the network is disposed in the plate circuit of a crystal-controlled oscillator which is adapted to cease operating when said critical condition is reached, whereupon a responding device sensitive to the transition from the oscillating to the nonoscillating state halts the driving motor for the tuning device.

An important feature of the invention resides in the provision made for starting the oscillator when it is quiescent, preparatory to making a test.

Other objects and features will appear in the course of the following description of the invention.

Figure 3:
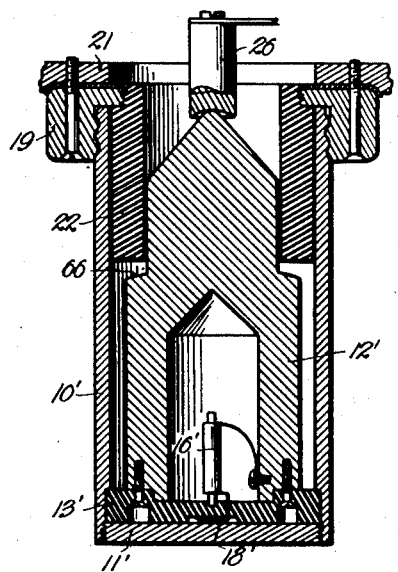
Figure 2:
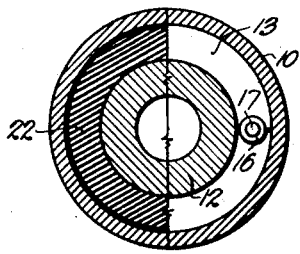
Figure 4:
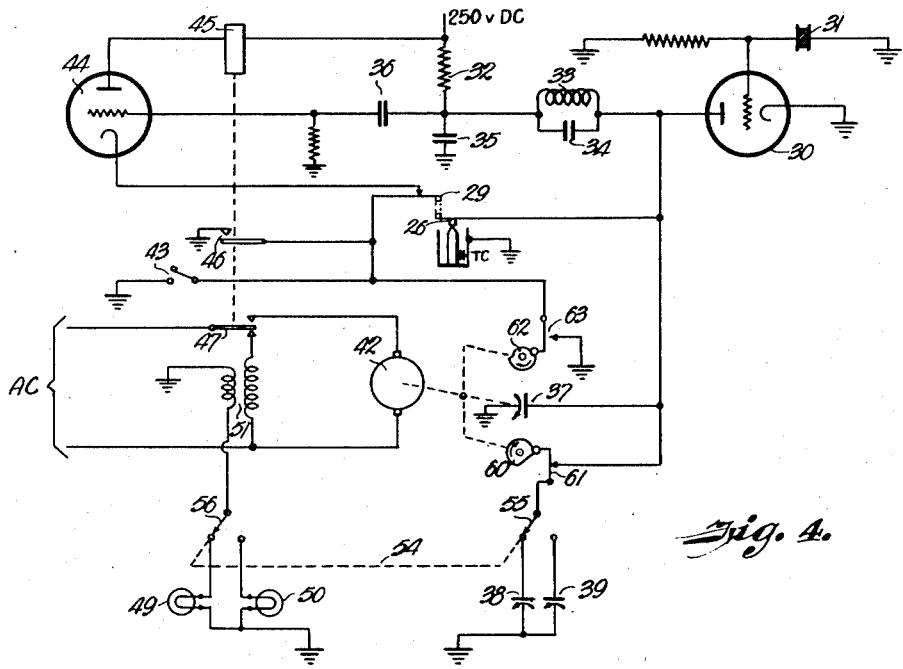
Figure 5:
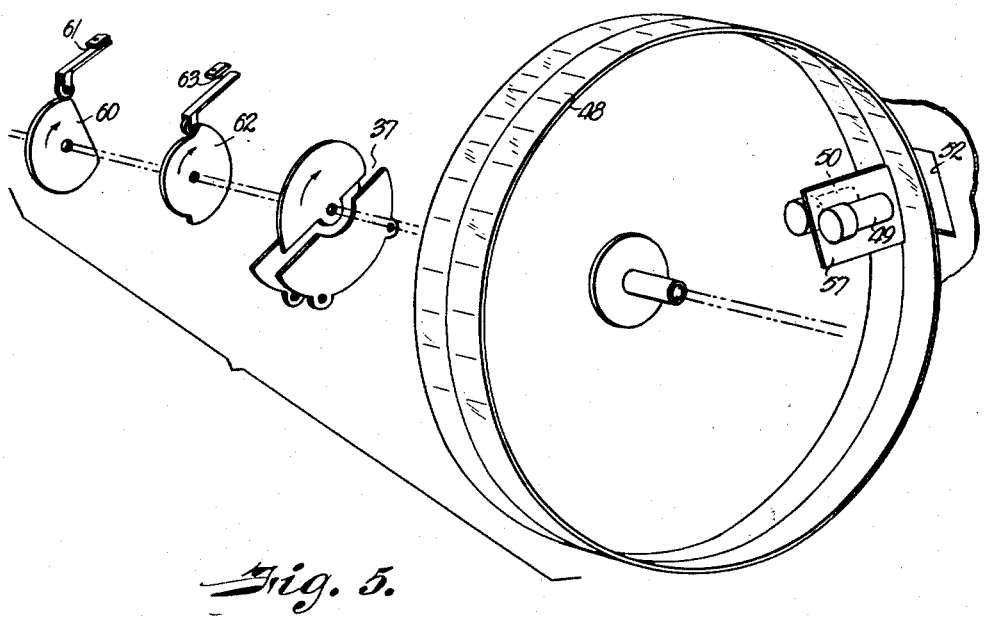
Figure 6:
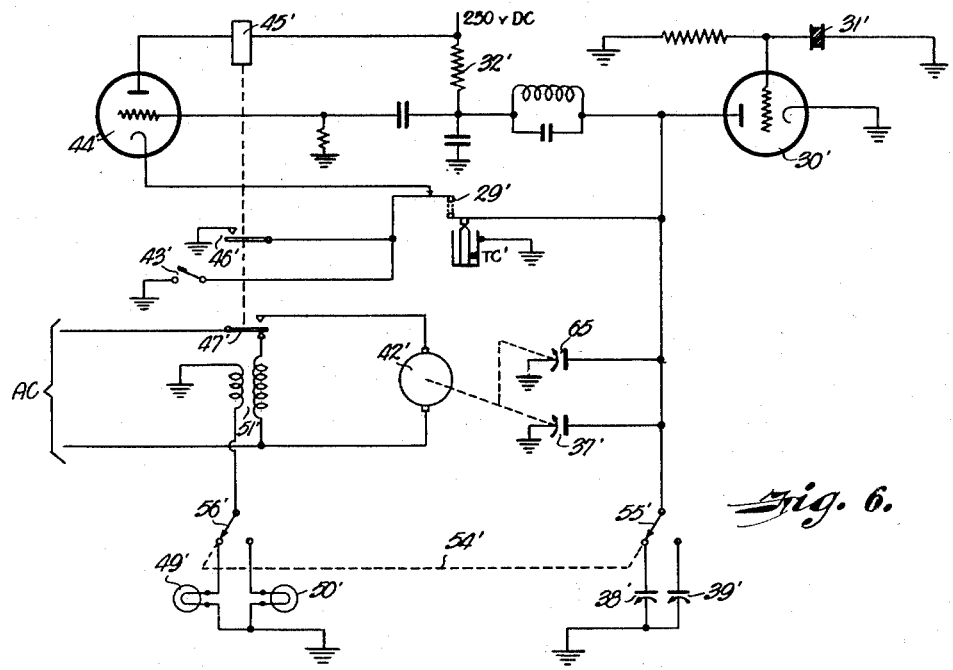
Figure 7:
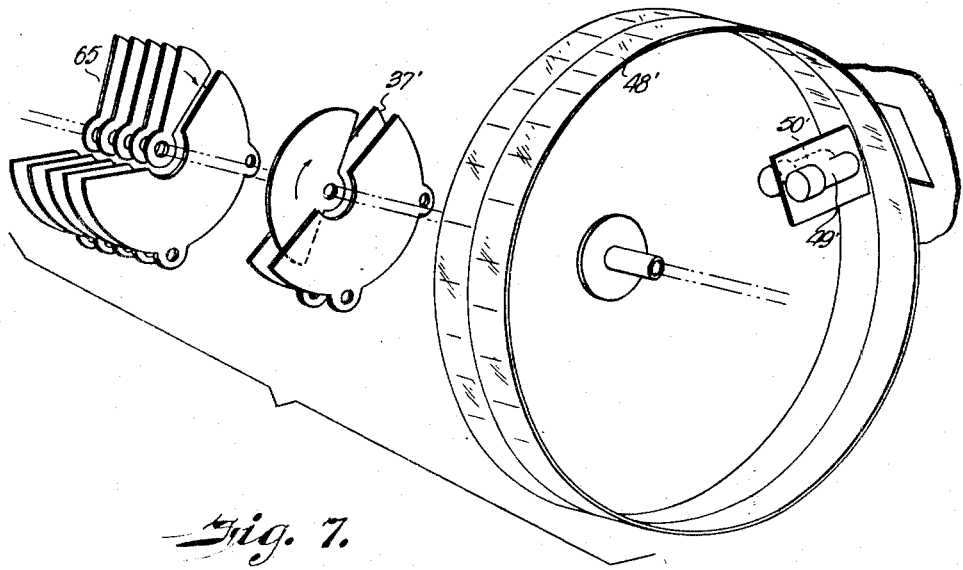

In the accompanying drawings which form a part of the specification and are to be read in conjunction therewith, and in which like reference numerals are employed to identify like parts of the various views, Fig. 1 is a cross sectional view of a cell for holding one type of material to be tested, showing this test cell in operative relationship to the moisture meter, Fig. 2 is a transverse cross sectional view taken along the line 2—2 of Fig. 1 in the direction of the arrows, Fig. 3 is a cross sectional view of a test cell for another type of material, showing a modified construction, Fig. 4 is a schematic diagram of the circuit components of the moisture meter, Fig. 5 is a schematic illustration of the physical relationship of various parts driven by the motor of Fig. 4, Fig. 6 is a schematic diagram of a modified circuit for the moisture meter, and Fig. 7 is a schematic illustration of the relationship of various parts driven by the motor of Fig. 6.

Referring first to Fig. 1, the test cell shown therein comprises a cylindrical cup or receptacle adapted to hold a representative specimen of the material whose moisture content is to be measured. It is formed of a metal tube 10 one end of which is closed by a bottompiece 11 screwed into or otherwise affixed to the tube. Within the cup there stands a hollow metal post 12. This post is disposed centrally of the tubular shell and is fastened to a disk-like insulator 13 by means of screws 14, the insulator in turn being clamped tightly between the bottompiece 11 and an annular shoulder 15 provided on the inner wall of shell 10. It will be observed that post 12 has a cone-shaped tip but is cylindrical throughout the balance of its length.

At the bottom of the test cell there is a hollow tubular condenser 16 encircling a vertical supporting stud or rod 17. One of its terminals is connected to the central post 12 through the medium of one of the screws 14, while the other terminal is connected to the outer shell through the medium of a dished spring disk 18 positioned in a recess in the bottom of insulator 13. The condenser's outer cover of electrical insulation and the supporting stud 17 both are made of material having relatively high thermal conductivity; and the condenser employs a dielectric having a negative temperature coefficient (e. g., titanium oxide) the purpose of which will be made clear presently.

The upper end of the sample-receiving cup is provided with external threads whereby it can be screwed into an internally threaded supporting collar 19 and thus be made to depend from said collar. The collar in turn is fastened by screws 20 to a stationary metal support 21 which in practice is part of the housing for the circuit components of the moisture meter. As the test cell is screwed into the collar, a cylindrical ring or sleeve 22 extending downwardly from the collar is adapted to enter the mouth of the cup and encircle the central post 12. This sleeve is formed of insulating material and is secured to an inwardly extending annular flange 23 which also serves as a stop for the upper end of the cup; the internal and external diameters of the sleeve are such that it slides as a piston between post 12 and the wall of the cup.

A predetermined quantity of material always is employed in making a test for moisture content, this quantity being such that when it is poured into the cup the level of the loose material falls slightly below the tapered portion of post 12. Accordingly, when the cup thereafter is screwed into collar 19 until its rim abuts flange 23, sleeve 22 compresses the sample to a predetermined density. In other words, so far as the density of the specimen is concerned test conditions can be duplicated repeatedly simply by employing the same quantity of material in every instance.

The central post 12 and encircling shell 10 form two electrodes between which the compressed test materal is disposed as a dielectric. The dielectric constant of granular material such as flour, wheat or powdered milk ranges (in the absence of water) from approximately 4 to 6. The dielectric constant of water, on the other hand, is approximately 80, and consequently it will be seen that the capacitance of the test cell if measured by a suitable instrument is a reliable indicia of the relative amount of water contained in the specimen between the electrodes.

To measure this factor, i. e., the capacitance of the test cell, electrical contact is made with the outer electrode through collar 19, while a terminal 26 positioned centrally of sleeve 22 and at its upper end makes contact with the inner electrode. Terminal 26 is supported by a leaf spring 27, the spring in turn being mounted on an insulator 28 affixed to the casing 21. As the test cell is screwed into collar 19 the tip of post 12 makes the necessary electrical contact with the concave end of the terminal and, assuming the cup is screwed tightly home against flange 23, deflects spring 27 enough to close contact 29, as shown. This contact normally is open, and should the operator inadvertently fail to turn the sample cup up tightly, it therefore will remain open; as will be explained presently, this makes it impossible to take a reading with the meter until the situation is corrected and thus guards against inaccuracy resulting from failure to achieve the predetermined density of the test specimen, discussed above.

It will be convenient at this point to consider the circuits of the moisture meter more in detail, reference being had for this purpose to the schematic diagram contained in Fig. 4. Vacuum tube 30 comprises an oscillator, the frequency of which is controlled in conventional fashion by a crystal 31 in its grid circuit. (An oscillation frequency in the neighborhood of one megacycle is suitable.) The plate current for the oscillator tube 30 flows through a resistor 32, the magnitude of this current and hence the voltage drop across resistor 32 being governed by the tuning of a parallel resonant circuit or network connected to the plate of the tube, which circuit is composed of inductance 33, condensers 34 to 38, inclusive, and the test cell TC.

It is well known to those versed in the art that a crystal oscillator of this type will operate only when the effective overall reactance of its plate circuit at oscillation frequency is inductive; if the plate circuit is tuned toward resonance by increasing the total plate circuit capacitance, a point is reached at which the oscillator suddenly stops operating; and the sudden transition from an oscillating to a nonoscillating state is accompanied by a considerable surge in D. C. plate current. Oscillation can be reinstituted only by making the inductive reactance again predominate, for instance by reducing the total plate circuit capacitance to a value materially below that at which oscillation halted.

Attention is directed to the fact that the capacitance represented by test cell TC is in parallel with the variable tuning condenser 37 and the trimmer condenser 38. The trimmer is employed to adjust the range of the meter to the testing of a particular material and once set it is not changed. Its setting is such that even when the capacitance of the test cell is at the highest value expected in practice (due to measurement of high moisture content material) the oscillator will continue to operate if the capacity of tuning condenser 37 is at a minimum; and the range of condenser 37 on the other hand is such that, with trimmer 38 thus adjusted, it is capable at or near its maximum capacitance of bringing the oscillator to a halt even when the capacitance of the test cell is at the lowest value expected in practice.

Condenser 37 is varied by motor 42 which is adapted to turn in but one direction, the operation of the meter being as follows. Assuming that a measured specimen of material has been poured into the test cell and the cell mounted as described hereinbefore, the operator then momentarily depresses the starting push button 43. This connects ground potential over contact 29 to the cathode of vacuum tube 44, resulting in the energization of relay 45 in the plate circuit of the tube 44. Upon operation of the relay, locking contact 46 closes and by connecting ground potential over contact 29 to the cathode of the tube insures that the tube will remain energized (and the relay hence remain operated) when the starting push button 43 now is permitted to reopen. At the same time, the relay operates armature 47 thereby completing an obvious circuit from the alternating current source to motor 42. The motor accordingly begins to turn the rotor of tuning condenser 37 through a gear train at a speed of approximately 4 R. P. M.

Assuming the starting position of the tuning condenser to be that shown in Fig. 5 (in which position its capacitance is at a minimum) its value will increase until the condenser brings the total plate capacitance of the oscillator 30 to the critical value at which the oscillator ceases to operate. If the capacitance of the test cell TC is high this critical value obviously will be reached with less rotation of condenser 37 than will be required if the capacitance of the test cell is low.

Tuning condenser 37 stops rotating substantially instantly when the critical value is reached. More specifically, the surge generated in the oscillator's plate circuit incident to the transition from an oscillating to a nonoscillating state produces in resistor 32 a transient voltage of such magnitude and polarity as to bias the grid of tube 44 to cut off. By thus rendering the tube temporarily nonconductive, this causes relay 45 to restore to normal whereupon relay contact 46 disconnects ground from the cathode circuit of tube 44 in order to prevent reenergization of the relay upon cessation of the transient voltage condition in resistor 32. At the same time relay armature 47 drops back, opening the motor circuit whereupon the driving motor for the condenser halts abruptly. The driving motor assembly includes a magnetic clutch which is deenergized instantly upon cessation of current flow, thereby improving the instantaneous stoppage of rotation of tuning condenser 37.

The final position of tuning condenser 37 and its associated translucent dial 48 (see Fig. 5) therefore is determined by the capacitance of the test cell TC which, as previously suggested, is a reliable indicia of the moisture content of the test material forming the dielectric in the cell. In practice one section of the dial, for example the half which passes over incandescent lamp 49, is calibrated to read directly in units of moisture content of the flour sample.

Lamp 49 is connected to the secondary winding of a stepdown transformer 51, the primary winding of which is controlled by relay armature 47. It will be seen that while relay 45 is energized and hence while the motor 42 is turning, armature 47 maintains the primary winding of the transformer open so that lamp 49 is not lighted. In other words, while the dial is in motion before window 52 it is "dark," i. e., the scale markings thereon are not visible. However, as soon as the tuning condenser 37 reaches the point which is indicative of the moisture content of the sample the motor halts due to the deenergization of relay 45, and armature 47 simultaneously completes an obvious circuit through its back contact from the alternating current source to the primary winding of transformer 51, causing lamp 49 to illuminate the portion of the dial then positioned before window 52.

The dial calibration which applies to one material may not apply to another. Therefore, the portion of the dial passing over lamp 49 is calibrated for one material, say flour, while the portion passing over lamp 50 is calibrated for another, said dried milk or wheat. If the sample in the test cell is composed of the second material, the two-position manual switch 54 will be turned manually so that its contact 55 connects trimmer condenser 39 instead of trimmer 38 to the plate circuit of the oscillator. The function of the two trimmers is the same, one simply being adjusted for testing one material while the second is adjusted for testing another. The settings of the respective trimmers will be substantially alike where the characteristics of the two materials are much alike but they obviously may differ considerably, this being especially true where the materials are so different as to require different types of test cells, as will be explained presently.

At the same time that trimmer 39 is rendered effective due to switch 54 being turned to the position applicable to the testing of dried milk, switch contact 56 connects lamp 50 to the secondary winding of transformer 51. Thus, when tuning condenser 37 reaches the point indicative of the moisture content of the dried milk sample it halts due to the deenergization of relay 45, as explained hereinbefore, and armature 47 thereupon completes a circuit over its back contact for lighting lamp 50. A light shield 57 is positioned between lamps 49 and 50 so that neither lamp will illuminate more than its half of the dial.

Although facilities for testing only two materials have been shown it will be appreciated that this is intended merely to be illustrative. The dial may be provided with separate scales arranged side by side for as many different materials as desired, a separate trimmer condenser being employed for each material; selection of the appropriate trimmer by a multi-position switch would simultaneously connect up the lamp beneath the corresponding dial scale in the same general fashion as described above. It also is contemplated that a single dial scale may be employed for two or more materials in certain cases, appropriate adjustment to the use of a common scale being made by the trimmers employed for the respective materials.

Remembering now that the tuning condenser is brought to a halt at the proper point in its rotation due to the sudden transition of the oscillator from an oscillating to a nonoscillating state, it will be evident that oscillation must be reinstituted before the moisture content of another sample can be measured. In other words, assuming the sample in the test cell has been replaced by another sample, if the start contact 43 were closed without any provision for restarting the oscillator, relay 45 would energize and, consequently, start motor 42; but the motor thereafter would rotate the tuning condenser indefinitely without producing any useful result inasmuch as no transitory halting impulse would be generated in the resistor 32 as hereinbefore described. True, as the tuning condenser rotated it would vary the total plate circuit capacitance of the oscillator between certain maximum and minimum limits but this alone would not cause the oscillator to resume operation.

In order to start the oscillator it is necessary to reduce the total capacitative reactance of the oscillator plate circuit very materially below the minimum value obtainable by variation of the tuning condenser 37 alone. To achieve this end, a cam 60 is provided on the same shaft as the tuning condenser, this being arranged to open contact 61 for a very brief interval just as the tuning condenser is approaching its minimum value. The opening of contact 61 disconnects the trimmer condenser (38 or 39 as the case may be) from the plate circuit of the oscillator which momentarily reduces the total plate circuit capacitance of the oscillator to a level which makes the inductive reactance predominate to the degree necessary to restart the oscillator.

Cam 60 recloses contact 61 just prior to the time when the capacitance of the tuning condenser begins to increase. This will not halt the oscillator because, as already pointed out, the combined capacitance of the test cell TC and the trimmer are never enough to halt the oscillator when the tuning condenser is at its minimum value; however, at some point during the ensuing increase in the capacitance of the tuning condenser (which point will be governed by the capacitance of the sample in the test cell) the critical value of the plate circuit capacitance will be reached, causing the motor, the tuning condenser and the dial to halt as explained hereinbefore.

Any tendency of relay 45 to restore to normal due to the surge generated in resistor 32 incidental to the restarting of the oscillator is without effect inasmuch as a second cam 62 on the tuning condenser shaft is arranged to maintain contact 63 closed throughout the starting period and for a brief interval afterward. In other words, even if locking contact 46 should be opened due to the momentary deenergization of relay 45, contact 63 by maintaining ground potential connected over contact 29 to the cathode of the tube will insure reoperation of relay 45 as soon as the surge in resistor 32 comes to an end. It will be noted that cam 62 is arranged to maintain contact 63 open throughout the period that tuning condenser 37 is increasing from its minimum to its maximum value whereby said contact does not interfere with the release of the relay when such occurs as the result of the oscillator's transition from an oscillating to a nonoscillating state.

An alternative arrangement for restarting the oscillator is shown in Figs. 6 and 7. This employs in parallel with the tuning condenser 37' a special starting condenser 65, the structure of which will be apparent from Fig. 7. Its rotor plates comprise relatively narrow segments and its stator plates cover a plane angle in excess of 180° by an amount corresponding to double the width of the rotor plates. For example, rotor plates of about 30° plane angle and stator plates of 240° have been found satisfactory.

The starting condenser is so ganged with the tuning condenser that the former reaches its maximum capacity just as the latter reaches its minimum capacity; then throughout the ensuing 180° rotation (i. e., while the tuning condenser is increasing from its minimum to its maximum) the capacity of condenser 65 remains constant at its maximum value. After the tuning condenser passes its maximum and begins to decrease, the capacitance of condenser 65 also begins to decrease and because of the narrow span of its rotor plates it quickly reaches its minimum capacitance and thereafter remains at minimum level until it reaches the position illustrated or, in other words, until the tuning condenser has substantially reached its minimum.

Referring to Fig. 6, it will be seen that the circuit is like the one already described in that it has a crystal controlled oscillator 30', the output of which is impressed upon resistor 32'. In the plate circuit of the oscillator in parallel with the test cell TC are condensers 37', 38' and 65.

When the starting push button is depressed this energizes relay 45' which locks itself up at contact 46' while at contact 47' it starts motor 42' all as discussed hereinbefore. Trimmer 38' is set so that for every test material falling within the expected range of moisture values the critical point at which the oscillator ceases to operate will be reached in the 180° rotation of the tuning condenser during which it is increasing from its minimum capacitance to its maximum capacitance. When this critical point is reached, relay 45' restores to normal, the motor halts and lamp 49' lights as explained previously. A manual switch 54' having two (or more) positions is arranged to permit selection of different trimmer condensers whereby the meter may be adjusted quickly to the testing of different materials, the switch also serving to connect up the correct dial lamp in each case.

It will be understood that after a moisture-registering operation has been completed the dial remains stationary while the test material is removed from the test cell and replaced by the next sample to be tested. When push button 43' thereafter is momentarily closed relay 45' again starts motor 42' by closing contact 47'. Tuning condenser 37' advances to and passes its maximum capacitance whereupon condenser 65 quickly reduces the total plate circuit capacitance of the oscillator to a level which will reinstate oscillation; then as it continues to rotate, condenser 65 resumes its maximum value and, as it does this, the tuning condenser passes its minimum value and begins to increase. At some point during the ensuing 180° rotation of the tuning condenser (which point of course is dependent upon the capacitance of the test cell TC') the critical point is reached at which oscillation ceases, halting motor 42' and causing the dial to be illuminated to indicate the new reading.

It is possible with either of the circuit arrangements described to recheck the registered moisture content of the sample, if desired, before the test cell is removed from its mounting, simply by reoperating the starter button (43 or 43'). Each time this is done the motor is started and the measuring cycle repeated, it being understood that the same reading will be obtained in each case if there has been no change in the moisture content of the sample.

The meter preferably is calibrated to read directly in terms of the percentage moisture content of the sample at 20° C. If the temperature of any particular sample is higher or lower than 20° C. it is well known that the dielectric constant of that sample will be higher or lower than it would have been if the sample were at 20° C. It is for this reason that the negative temperature coefficient condenser 16 is provided in the test cell. The capacitance of condenser 16 also varies with temperature but in a reverse direction as compared to the variation in the test specimen. If the temperature of the test specimen is above 20° C. the temperature of condenser 16 will be above 20° C. by a like amount; the increase in the dielectric constant of the sample (and the consequent increase in the capacitance of the test cell) thus will be accompanied by a corresponding decrease in the capacitance of the compensating condenser 16.

Exact cancellation of the decrease against the increase, or vice versa, requires careful selection of the compensating condenser for the test cell. It also requires efficient and rapid heat exchange between the test material and the compensating condenser so that they always will be at the same temperature. In the case of flour, dried milk and like materials it has been found that the somewhat compressed condition of the sample in the test cell facilitates the heat exchange so that the thermal correction will be completed in all cases within a period of one minute after the test cell has been screwed into its supporting collar. In other words, regardless of the initial temperature of the sample a measurement taken one minute after mounting the test cell will yield an accurate, automatically corrected reading of the moisture content of the sample at 20° C.

The heat transfer inevitably would take place much more slowly in the case of wheat grain and like material due to the relatively large amount of dead air space between grains. Accordingly, for material of this kind (i. e., material having a comparatively large particle size) it has been found advisable to adopt a test cell constructed along the lines of the one shown in Fig. 3. This is generally similar to the cell shown in Figs. 1 and 2 except that the lower portion of the central post 12' is made larger in diameter whereby the annular space between the post and the encircling cylinder 10' is of such width that substantially all of the individual grains are directly in physical contact with the post or the cylinder. The negative temperature coefficient compensating condenser 16' is positioned within the hollow post, one terminal being connected to the post and the other to the exterior of the shell by means of spring washer 18' as shown.

Prior to being filled with the test material the cell naturally adjusts itself to the temperature of the ambient air, and the compensating condenser assumes the same temperature. A standard quantity of the grain is used for test purposes, this preferably being such that when it now is poured into the cell its level falls below shoulder 66. If the material is above or below room temperature it rather quickly is adjusted to room temperature due to contact of the individual grains with the walls of the cell; the mass of the cell is so much greater than the mass of test material that this results in substantially no change of the temperature of the cell or condenser 16' and, accordingly, the sample and the compensating condenser are for all practical purposes at the same temperature. The compensating condenser functions in the way previously described, whereby readings of moisture content, automatically corrected at 20° C., may be taken without any appreciable delay even in the case of grain or other material having large particle size.

It will be evident from the foregoing description that the dimensions and shape of the test cell employed for each type of material may be suited to the material, all the test cells, however, being interchangeably attachable to the supporting collar 19 for purposes of making the desired measurement. This does not mean, of course, that a different cell must necessarily be used in every instance, for it has been found in fact that each cell usually can be employed for two or more types of materials.

When a test cell is screwed into the supporting collar preparatory to making a moisture measurement it will be noted the connections are such that the entire exterior of the cell is at ground potential; this eliminates all possibility of the meter registration being affected by hand capacity effects. It also will be observed that if the test cell is not screwed up tightly into the supporting collar, as hereinbefore explained, contact 29 will maintain the cathode circuit of tube 44 open and hence prevent operation of the meter until the situation is corrected. An obvious alternative would be to place contact 29 in the plate circuit of the tube, in series with relay 45, rather than in the cathode circuit.

Although the description has dealt mainly with the use of the device to measure the moisture content of material normally employed in connection with the baking industry, it will be understood that this is intended merely to be illustrative. It may be employed equally well to determine the moisture content of solids and liquids such as tea, coffee, tobacco, slack coal, paper, artificial silk, cotton, wool, butter, oil, etc.; moreover, by proper design of the test cell it may be used to measure the moisture in air or gases, i. e., the percent humidity. It also will be evident that instead of being calibrated in terms of moisture content the dial may be calibrated to indicate directly the capacitance, inductance, dielectric constant, or any other electrical quantity which has a counterpart capable of measurement across the oscillator plate circuit.

Inasmuch as many possible embodiments of the invention may be made without departing from the scope thereof it is to be understood that all matter herein set forth or shown in the accompanying drawings is to be interpreted as illustrative and not in a limiting sense.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the claims.

Having thus described our invention, we claim:

1. Apparatus for measuring the moisture content of a material, comprising a pair of spaced-apart electrodes between which a sample of the material is disposed as a dielectric, an oscillator tube having said electrodes and sample connected in its plate circuit, an inductance coil and a variable tuning condenser also connected in the plate circuit of said tube, means for adjusting said tuning condenser to the critical point at which said oscillator stops operating, signal means controlled by said oscillator to operate at said critical point, and a dial for the condenser calibrated to register directly the percentage moisture content of the sample at that point.

2. Apparatus as claimed in claim 1, including a negative temperature coefficient condenser disposed in heat exchange relation to the sample and having its terminals connected respectively to said electrodes whereby said condenser compensates for variations in the dielectric constant of the sample due to temperature changes.

3. A device for measuring the moisture content of a sample comprising a pair of spaced-apart electrodes between which the sample is disposed as a dielectric, a variable tuning condenser connected to said electrodes in bridge of said sample, a driving motor for said condenser, means for completing a circuit to said motor thereby to cause it to drive said tuning condenser, means operated to halt said motor responsive to said tuning condenser bringing the effective total capacitance of said condenser and electrodes to a predetermined value, and an indicator connected to said condenser for registering its stopping point.

4. A device as claimed in claim 3, including a lamp for illuminating the indicator, and means for lighting said lamp responsive to the effective total capacitance of said condenser and electrodes reaching said predetermined value.

5. Apparatus for testing materials, comprising a pair of spaced-apart electrodes between which a sample of the material is disposed, an oscillator tube having said electrodes and sample connected in its plate circuit, inductive and capacitative reactors also connected in the plate circuit of said tube, a motor mechanically connected to one of said reactors for adjusting same, means for completing a circuit to said motor, means controlled by the motor during its initial rotation for starting said oscillator to operate, said one reactor thereafter driven by said motor in such a direction as to tune the plate circuit toward resonance until said oscillator ceases to operate, a device operated to interrupt the motor circuit responsive to the cessation of said oscillator's operation, and an indicator operated by the motor in accordance with its stopping point.

6. A device for measuring the moisture content of a sample, comprising a pair of spaced-apart electrodes between which the sample is disposed, an oscillator tube having said electrodes and sample connected in its plate circuit, a variable tuning condenser also connected in said plate circuit, means for alternately increasing and decreasing the capacitance of said tuning condenser, said oscillator effective during said tuning condenser's increase in capacitance to stop operating responsive to the capacitance of the tuning condenser reaching a value bearing a predetermined relationship to the capacitance of said electrodes and sample, means controlled in accordance with the capacitance of the tuning condenser at the time said oscillator stops operating for registering the moisture content of the sample, and means cooperating with said tuning condenser for restarting the oscillator in the subsequent period during which said tuning condenser is decreasing in capacitance.

7. A device for measuring the moisture content of a sample comprising a pair of spaced-apart electrodes between which the sample is disposed, an oscillator tube having said electrodes and sample connected in its plate circuit, a variable tuning condenser also connected in said plate circuit, means for alternately increasing and decreasing the capacitance of said tuning condenser, an auxiliary condenser connected in said plate circuit, the capacitance of the auxiliary condenser being adapted to remain constant during the increase in capacitance of said tuning condenser, said oscillator effective during said tuning condenser's increase in capacitance to stop operating responsive to the capacitance of the tuning condenser reaching a value bearing a predetermined relationship to the capacitance of said electrodes and sample, means controlled in accordance with the capacitance of the tuning condenser at the time said oscillator stops operating for registering the moisture content of the sample, and means synchronized with said tuning condenser for reducing the capacitance of said auxiliary condenser in the period during which said tuning condenser is decreasing in capacitance thereby to restart said oscillator.

8. In combination, an oscillator tube in the plate circuit of which devices having random values of reactance are connectable, a variable tuning reactance connected in said plate circuit, a driving motor for said tuning reactance, means for completing a circuit to said motor thereby to cause it to drive said tuning reactance, means operated by said oscillator for halting said motor responsive to said tuning reactance reaching the critical point at which said oscillator ceases to operate, and a dial for registering the stopping point of said tuning reactance.

9. In combination, an oscillator tube in the plate circuit of which devices having random values of reactance are connectable, a plurality of reactances each having a predetermined arbitrary value of reactance, means including a manually operable switch for selectively connecting any one of said last reactances to the plate circuit of said tube, a variable tuning reactance also connected to said plate circuit, a driving motor for said tuning reactance, means for completing a circuit to said motor thereby to cause it to drive said tuning reactance, means operated by said oscillator for halting the motor responsive to said tuning reactance reaching the critical point at which said oscillator ceases to operate, and a dial for registering the stopping point of said tuning reactance.

10. In combination, a normally conductive grid-controlled tube having a resistor in its grid circuit, an oscillator tube the output of which is impressed upon said resistor, means for connecting random values of reactance to the plate circuit of said oscillator, a variable tuning reactance also connected to said plate circuit, a driving motor for said tuning reactance, means for completing a circuit for said motor thereby to cause it to drive said tuning reactance whereby said oscillator is effective to generate a surge in said resistor responsive to said tuning reactance reaching a predetermined relationship to the random value of said reactance connected to said plate circuit, and a device in the plate circuit of said first tube effective to halt said motor responsive to said surge.

11. A combination as in claim 10, wherein said device comprises a relay de-energized responsive to said surge, and a contact on said relay for preventing re-energization of the relay at the cessation of said surge.

12. In combination, an oscillator tube having a variable reactor connected to its plate circuit, means for moving said reactor in such a way as to alternately increase and decrease its reactance, said oscillator effective whenever said reactance is changing in a particular direction to cease operating responsive to said reactor reaching a critical point in such change, and auxiliary means associated with said reactor for restarting said oscillator during the change of its reactance in the opposite direction.

13. In combination, an oscillator tube having a variable reactor connected to its plate circuit, means for moving said reactor in such a way as to alternately increase and decrease its reactance, said oscillator effective whenever said reactance is changed in a particular direction to cease operating responsive to said reactor reaching a critical point in such change, a second reactor connected to the plate circuit of said tube and adapted to remain constant in value during the change of said first reactor in a particular direction, and means for changing the value of said second reactor during the change of the first reactor in the opposite direction thereby to restart the oscillator.

14. In combination, an oscillator tube having inductive and capacitative reactors in its plate circuit, a motor, means for completing a circuit to said motor, means controlled by said motor during its initial rotation for temporarily adjusting the relative values of said reactors thereby to make the over-all plate circuit reactance of said tube so predominately inductive as to cause said oscillator to start operating, means then controlled by said motor during its ensuing rotation to tune said plate circuit progressively toward resonance until said oscillator stops operating, and a device operated to interrupt said motor circuit responsive to the cessation of said oscillator's operation.

15. In combination, an oscillator tube having inductive and capacitative reactors in its plate circuit, a motor, means for completing a circuit to said motor, means controlled by the motor during its initial rotation for starting said oscillator, means then controlled by said motor during its ensuing rotation for tuning said plate circuit progressively toward resonance until said oscillator stops operating, and a device operated to interrupt said motor's circuit responsive to the cessation of said oscillator's operation.

CHARLES N. KIMBALL.
WILLIAM R. LEWIS.
HERMAN A. STRECKER.

REFERENCES CITED

The following references are of record in the file of this patent:

UNITED STATES PATENTS

| Number | Name | Date |
|---|---|---|
| 1,838,084 | Drake | Dec. 29, 1931 |
| 1,876,449 | Cook | Sept. 6, 1932 |
| 2,222,221 | Burford | Nov. 19, 1940 |
| 2,251,641 | Stein | Aug. 5, 1941 |
| 2,266,114 | Bartlett | Dec. 16, 1941 |
| 2,271,983 | La Rue | Feb. 3, 1942 |
| 2,297,346 | Crist | Sept. 29, 1942 |
| 2,304,871 | Andrews | Dec. 15, 1942 |
| 2,343,340 | Stevens | Mar. 7, 1944 |
| 2,383,480 | Heyman | Aug. 28, 1945 |
| 2,407,270 | Harrison | Sept. 10, 1946 |
| 2,428,700 | Eilenberger | Oct. 7, 1947 |
| 2,460,199 | Taylor et al. | Jan. 25, 1949 |